United States Patent
Khandal et al.

(10) Patent No.: US 7,923,484 B2
(45) Date of Patent: Apr. 12, 2011

(54) PROCESS FOR POLYMERISATION OF DIETHYLENE GLYCOL BIS ALLYL CARBONATE

(75) Inventors: Rakesh Kumar Khandal, Delhi (IN); Geetha Seshadri, Delhi (IN); Gauri Shankar Jha, Delhi (IN)

(73) Assignee: Shriram Institute for Industrial Reasearch (IN)

( * ) Notice: Subject to any disclaimer, the term of this patent is extended or adjusted under 35 U.S.C. 154(b) by 0 days.

(21) Appl. No.: 11/886,387

(22) PCT Filed: Jan. 16, 2006

(86) PCT No.: PCT/IN2006/000012
§ 371 (c)(1),
(2), (4) Date: Sep. 14, 2007

(87) PCT Pub. No.: WO2006/075338
PCT Pub. Date: Jul. 20, 2006

(65) Prior Publication Data
US 2008/0182916 A1    Jul. 31, 2008

(30) Foreign Application Priority Data
Jan. 17, 2005   (IN) .................. 99/DEL/2005

(51) Int. Cl.
*C08F 2/50*    (2006.01)
*C08F 2/42*    (2006.01)

(52) U.S. Cl. .............. 522/183; 522/13; 522/24; 522/60; 522/154; 522/163; 522/162; 522/178

(58) Field of Classification Search ............ 522/13, 522/24, 60, 154, 163, 162, 183, 178
See application file for complete search history.

(56) References Cited

U.S. PATENT DOCUMENTS 4,138,538 A * 2/1979 Kaetsu et al. ................. 522/5
4,812,545 A * 3/1989 Renzi et al. .............. 526/230.5

FOREIGN PATENT DOCUMENTS

JP    59045312 A  *  3/1984

OTHER PUBLICATIONS

Darrraud-Taupic et al. The study of free radicals in poly (diethylene glycol bisallyl carbonste) irradiated by gamma rays. Polymer vol. 37, No. 13, pp. 3251-3254 (1995).*

* cited by examiner

Primary Examiner — Sanza L McClendon
(74) Attorney, Agent, or Firm — The Webb Law Firm

(57) ABSTRACT

A process for polymerization of diethylene glycol bis allyl carbonate which may advantageously be employed for producing plastic lenses having a low refractive index comprising in the step of subjecting diethylene glycol bis allyl carbonate to the step of gamma radiation in the presence of diiso propyl peroxydicarbonate as a catalyst.

4 Claims, No Drawings

PROCESS FOR POLYMERISATION OF DIETHYLENE GLYCOL BIS ALLYL CARBONATE

FIELD OF INVENTION

This invention relates to a process for polymerization of diethylene glycol bis allyl carbonate. The polymerized carbonate may be used for lenses Having a low refractive index.

BACKGROUND OF INVENTION

Plastic ophthalmic lenses are classified by their refractive index, and the refractive index defines the power of the lens.

Hitherto, lenses having a low refractive index (1.52) was normally made by the thermal polymerization of diethylene glycol bis allyl carbonate. The process consisted in subjecting diethylene glycol bis allyl carbonate to the step of thermal polymerization in the presence of thermal initiator normally comprising diiso propyl peroxydicarbonate. Such a thermal polymerization consisted of a thermal cycle at different temperatures.

A disadvantage associated with such a known process is that of high power consumption and time consuming.

OBJECTS OF THE INVENTION

An object of this invention is to propose an improved process for polymerization of diethylene glycol bis allyl carbonate which may advantageously be used for the manufacture of ophthalmic lenses of low refractive index.

Another object of this invention is to propose a process for polymerization of diethylene glycol bis allyl carbonate which avoids a high power consumption as associated with the known process.

Still another object of this invention is to propose a process for polymerization of diethylene glycol bis allyl carbonate which may advantageously be used for the manufacture of ophthalmic lenses having good optical properties.

Yet another object of this invention is to propose a process for polymerization of diethylene glycol bis allyl carbonate, which is efficient.

DESCRIPTION OF INVENTION

According to this invention there is provided a process for polymerization of diethylene glycol bis allyl carbonate which may advantageously be employed for producing plastic lenses having a low refractive index comprising in the step of subjecting diethylene glycol bis allyl carbonate to the step of gamma radiation in the presence of diiso propyl peroxydicarbonate as a catalyst.

In accordance with this invention the process of polymerization comprises in the step of gamma radiation in distinction to the known process of thermal polymerization. Specifically, the present invention envisages in subjecting diethylene glycol bis allyl carbonate to the step of gamma radiation in the presence of said catalyst for a period of 8 to 10 hours and at a radiation dose of 75 to 85 KGy. If, the dose is increased to more than 85K KGy, then the lens has a yellowish colour. However, if the dose is below 75KGy, the polymerization is incomplete.

Preferably, 1 to 1.5% of catalyst is used in the said step of polymerization.

Further objects and advantages are apparent from the ensuing examples:

Example 1

Diethylene glycol bis allyl carbonate also known as CR-39 is taken and mixed with 1.2% of diiso propyl peroxy carbonate also known as IPP. The mixture is taken in a syringe and injected into glass blanks fitted in a gasket. The mold containing the polymerization mixture is exposed to gamma radiation of 15-85 klay.

The glass blanks turned dark known on exposure to gamma irradiation, colorless, clean and transparent lenses having a refractive index of 1.52, transmittance greater than 90% and Barcol hardness of 40 was obtained.

We claim:

1. A method for polymerization of diethylene glycol bis (allyl carbonate) consisting essentially of irradiating diethylene glycol bis(allyl carbonate) monomer with gamma radiation in the presence of diisopropyl peroxydicarbonate as a catalyst.

2. The method as claimed in claim 1, wherein the radiation dose is 75 to 85KGy.

3. A method for polymerization of diethylene glycol bis (allyl carbonate) comprising irradiating diethylene glycol bis (allyl carbonate) monomer with gamma radiation in the presence of diisopropyl peroxydicarbonate as a catalyst, wherein the radiation is carried out for a period of 8 to 10 hours.

4. The method as claimed in claim 1, wherein the catalyst is present in an amount of 1 to 1.5%.

* * * * *

UNITED STATES PATENT AND TRADEMARK OFFICE
CERTIFICATE OF CORRECTION

| | |
|---|---|
| PATENT NO. | : 7,923,484 B2 |
| APPLICATION NO. | : 11/886387 |
| DATED | : April 12, 2011 |
| INVENTOR(S) | : Rakesh Kumar Khandal |

It is certified that error appears in the above-identified patent and that said Letters Patent is hereby corrected as shown below:

Title Pg, Item (73) (Assignee), delete "Reasearch" and insert -- Research -- therefor.

Title Pg, Item (56) (Other Publications), delete "carbonste)" and insert -- carbonate) -- therefor.

Signed and Sealed this
Thirteenth Day of September, 2011

David J. Kappos
*Director of the United States Patent and Trademark Office*